(12) United States Patent
Warsop

(10) Patent No.: US 8,887,484 B2
(45) Date of Patent: Nov. 18, 2014

(54) THRUST VECTORING APPARATUS FOR A JET ENGINE, CORRESPONDING JET ENGINE, THRUST VECTORING METHOD AND UPGRADING METHOD FOR A JET ENGINE

(75) Inventor: Clyde Warsop, Lydney (GB)

(73) Assignee: BAE SYSTEMS plc, London (GB)

( * ) Notice: Subject to any disclaimer, the term of this patent is extended or adjusted under 35 U.S.C. 154(b) by 990 days.

(21) Appl. No.: 13/002,532

(22) PCT Filed: Jun. 23, 2009

(86) PCT No.: PCT/GB2009/050716
§ 371 (c)(1),
(2), (4) Date: Mar. 23, 2011

(87) PCT Pub. No.: WO2010/001147
PCT Pub. Date: Jan. 7, 2010

(65) Prior Publication Data
US 2011/0167788 A1 Jul. 14, 2011

(30) Foreign Application Priority Data

Jul. 4, 2008 (GB) .................................. 0812242.6
Sep. 16, 2008 (EP) .................................. 08275052

(51) Int. Cl.
| | | |
|---|---|---|
| *F02K 1/28* | (2006.01) | |
| *B64C 15/02* | (2006.01) | |
| *F02K 1/00* | (2006.01) | |
| *F02K 3/077* | (2006.01) | |
| *F02K 1/36* | (2006.01) | |

(52) U.S. Cl.
CPC ............ *F02K 1/008* (2013.01); *F05D 2270/173* (2013.01); *B64C 15/02* (2013.01); *F02K 1/28* (2013.01); *F02K 3/077* (2013.01); *F02K 1/36* (2013.01)
USPC .......................... 60/204; 60/231; 239/265.17

(58) Field of Classification Search
CPC ................ F02K 1/28; F02K 1/30; F02K 9/82
USPC .................. 60/204, 231; 239/265.17
See application file for complete search history.

(56) References Cited

U.S. PATENT DOCUMENTS

| | | |
|---|---|---|
| 2,799,990 A | 7/1957 | Hausmann |
| 2,812,636 A | 11/1957 | Kadosch et al. |

(Continued)

FOREIGN PATENT DOCUMENTS

| | | |
|---|---|---|
| EP | 1 158 156 A2 | 11/2001 |
| EP | 1 741 915 A1 | 1/2007 |

(Continued)

OTHER PUBLICATIONS

Flaviir Project: "Fluidic thrust vectoring electric demonstrator", Poster on the Flaviir Project Website, Cranfield University, BAE Systems, Oct. 10, 2005, URL: http://www.flaviir.com/Data/FTVdemo.ppt, retrieved on Feb. 3, 2009.

(Continued)

*Primary Examiner* — Ted Kim
(74) *Attorney, Agent, or Firm* — Scully, Scott, Murphy & Presser, PC

(57) ABSTRACT

The thrust vectoring apparatus comprises: a housing defining a primary outlet for emitting the primary jet; Coanda surfaces extending from opposing regions of said housing, and radially spaced from the primary outlet such that a step is defined between each Coanda surface and the primary outlet; ducts leading from a fluid source to secondary outlets; and flow control means operable to control the mass flow through the secondary outlets. When the jet engine operates to exhaust a primary jet through the primary outlet, low pressure regions are formed in the vicinity of the steps. Each secondary outlet is located adjacent one of the Coanda surfaces so as to emit a secondary flow into a low pressure region. On activation of the secondary flow by the flow control means, the primary jet is entrained by the Coanda surface opposing the Coanda surface adjacent said the secondary outlet from which the secondary flow has been emitted. Method of vectoring the thrust or of upgrading existing jet engines with the thrust vectoring apparatus and jet engines comprising the thrust vectoring apparatus are disclosed.

13 Claims, 3 Drawing Sheets

(56) References Cited

U.S. PATENT DOCUMENTS

| | | | |
|---|---|---|---|
| 4,018,384 A | | 4/1977 | Fitzgerald et al. |
| 5,435,489 A | * | 7/1995 | Jenkins et al. ............ 239/265.17 |
| 5,706,650 A | * | 1/1998 | Thayer ............................ 60/231 |
| 6,679,048 B1 | * | 1/2004 | Lee et al. ......................... 60/204 |
| 2007/0144141 A1 | * | 6/2007 | Roberge et al. ............... 60/226.1 |

FOREIGN PATENT DOCUMENTS

| | | |
|---|---|---|
| GB | 2 398 046 A | 8/2004 |
| JP | 64-26006 | 2/1989 |
| JP | 2006-322395 | 11/2006 |
| WO | WO 96/20867 | 7/1996 |

OTHER PUBLICATIONS

International Search Report dated Aug. 4, 2009.
Extended European Search Report dated Feb. 16, 2009.
UK Search Report dated Oct. 21, 2008.
International Report on Patentability dated Jun. 21, 2010.

* cited by examiner

THRUST VECTORING APPARATUS FOR A JET ENGINE, CORRESPONDING JET ENGINE, THRUST VECTORING METHOD AND UPGRADING METHOD FOR A JET ENGINE

The present invention concerns improvements relating to thrust vectoring in jet engines. In particular, the present invention relates to fluidic thrust vectoring using secondary jets to influence the direction in which a primary jet is emitted. The influence of the secondary jet on the primary jet occurs as a result of the Coanda effect.

The exploitation of the Coanda effect for the purpose of fluidic thrust vectoring is known in jet engines. A primary jet is emitted from a tailpipe that terminates in a Coanda surface to which fluid flow can be entrained. It will be understood that a Coanda surface is a surface that is shaped so as to exploit the Coanda effect. The Coanda effect is the well-known effect that jets of fluid tend to follow curved surfaces, and has been exploited in aircraft design for some time. The degree of entrainment can for example be controlled by control of the mass flow through a secondary jet expelled between the primary jet and the Coanda surface extending from the tailpipe. Essentially, the higher the mass flow through the secondary jet, the larger the degree of entrainment. As the degree of entrainment changes, the direction of thrust developed by the primary jet also changes. Thus thrust vectoring can be accomplished by the control of the mass flow through the secondary jet. Such a system is disclosed, for example, in U.S. Pat. No. 2,812,636 to Kadosch. A similar system is disclosed in the poster entitled 'Fluidic thrust vectoring electric demonstrator' that is available online at http://www.flaviir.com/Data/FTVdemo.ppt. Typically, a normal force coefficient (the ratio of the component of the force normal to the un-deflected jet to the total thrust force generated by the engine) of around 0.2 to 0.25 can be achieved with a mass flow through the secondary jet of around 15% of that through the primary jet.

Another example of a fluidic thrust vectoring system is disclosed in Grumman Aerospace Corporation's International Patent Application, Publication Number WO 96/20867, which describes a system in which fluidic control jets are injected perpendicularly to the primary jet flow, so as to form a fluidic obstacle to the primary jet and thereby to bias the primary jet towards a Coanda surface extending from the rear of the tailpipe. Such a system thus employs very different fluid mechanical phenomena to those employed in the systems disclosed by Kadosch, and in the above-referenced poster. Moreover, there is no disclosure of the mass flow required in the secondary jets in order to make achieve thrust vectoring in the apparatus disclosed by the Grumman application.

In accordance with a first aspect of the present invention, there is provided thrust vectoring apparatus for a jet engine, the jet engine being operable to exhaust a primary jet to generate thrust; and the apparatus comprising: a housing defining a primary outlet for emitting the primary jet; Coanda surfaces extending from opposing regions of said housing, and outwardly spaced from the primary outlet such that a step is defined between each Coanda surface and the primary outlet; whereby, when a primary jet is exhausted through the primary outlet, low pressure regions are formed in the vicinity of said steps; ducts leading from a fluid source to secondary outlets, each secondary outlet being located adjacent one of the Coanda surfaces and arranged to emit secondary flows into the low pressure regions in the vicinity of the step between said one of the Coanda surfaces and the primary outlet; and flow control means operable to control the mass flow through the secondary outlets; wherein, when a secondary flow is emitted from one of said secondary outlets, the primary jet is entrained by the Coanda surface opposing the Coanda surface adjacent said one of said secondary outlets.

It will be noted that the control of the thrust vectoring apparatus of the present invention is entirely contrary to that of prior known thrust vectoring apparatus such as that disclosed in the above referenced poster, or that described in U.S. Pat. No. 2,812,636.

The flow control means may be operable to control the mass flow in the secondary flow within the range 0% to 5% of the mass flow in the primary jet, or, more preferably, the flow control means are operable to control the mass flow in the secondary flow within the range 0% to 2% of the mass flow in the primary jet. Thus, the mass flow needed through the secondary outlets is advantageously significantly lower than required in prior known fluidic thrust vectoring systems. The flow control means comprise a valve in operable association with each secondary outlet.

The fluid source may be provided by the ambient atmosphere surrounding the jet engine. Use of the ambient atmosphere as the fluid source is possible because of the low mass flow requirements of the present thrust vectoring system, and because the low pressure regions formed in the vicinity of the secondary outlets 'suck' air from the ambient atmosphere. It has been found by the present inventors that such an effect is sufficient to result in significant thrust vectoring.

Alternatively, the fluid source may be provided by bleed gases from the jet engine. For example, the bleed gases may be from one of the compressor section, the combustion section, and the bypass section of the jet engine. The use of bleed air provides a convenient manner in which to provide the mass flow for the secondary jets, since bleed flows are often already provided for other purposes in aircraft.

The secondary outlets may contain porous material through which the secondary jet can be emitted. It will be understood that such a porous material may be provided either by an inherently porous material, such as a metallic or ceramic foam, or by forming a plurality of small holes in an otherwise solid material, through which holes the secondary flow can be emitted. Suitable holes, that may have a diameter in the range 20 μm to 100 μm, can be formed, for example, by laser drilling. Use of porous materials enables the secondary outlets to be filled with substantially solid material. Since the dimensions of the secondary outlets must normally be machined to high tolerances, and retain those high tolerances even at the high working temperatures and varying pressures found at the exhaust end of a jet engine, the ability to fill the secondary outlets in this way can be highly advantageous. For example, for application to a jet engine used on a typical military aircraft, it may be necessary to machine a secondary slot having a height defined within a few tenths of a millimeter over a width of approximately one meter, and to maintain such a tolerance over temperatures varying up to around 600° C. Where the slot can be filled with porous materials, it is easier to machine outlets within such tolerances.

The thrust vectoring apparatus is applicable to jet engines of all shapes. For example, the primary outlet may be generally rectangular. Alternatively, the primary outlet may be generally circular.

The secondary outlets may be arranged to emit the secondary flow generally tangentially to the primary jet.

The invention extends to a jet engine comprising the thrust vectoring apparatus described above. The invention further extends to an aircraft comprising one or more such jet engines.

In accordance with a second aspect of the present invention, there is provided a method of vectoring thrust generated by a jet engine, the jet engine comprising a housing defining a primary outlet for exhausting a primary jet to generate thrust, and Coanda surfaces extending from opposing regions of said housing and outwardly spaced from the primary outlet such that a step is defined between each Coanda surface and the primary outlet; the method comprising the steps of: exhausting the primary jet from the primary outlet, such that low pressure regions are formed in the vicinity of said steps; emitting a secondary flow into the low pressure region in the vicinity of a first step between a first of the Coanda surfaces and the primary outlet to vector the thrust generated by the jet engine towards the Coanda surface opposing said first of the Coanda surfaces; and controlling the mass flow through the secondary outlet in order to control the degree to which the thrust is vectored.

In accordance with a third aspect of the present invention, there is provided a method of upgrading a jet engine, comprising retro-fitting the apparatus described above to the jet engine.

Preferred embodiments of the invention will now be described by way of example only, and with reference to the accompanying Figures, in which.

Figure 4A:
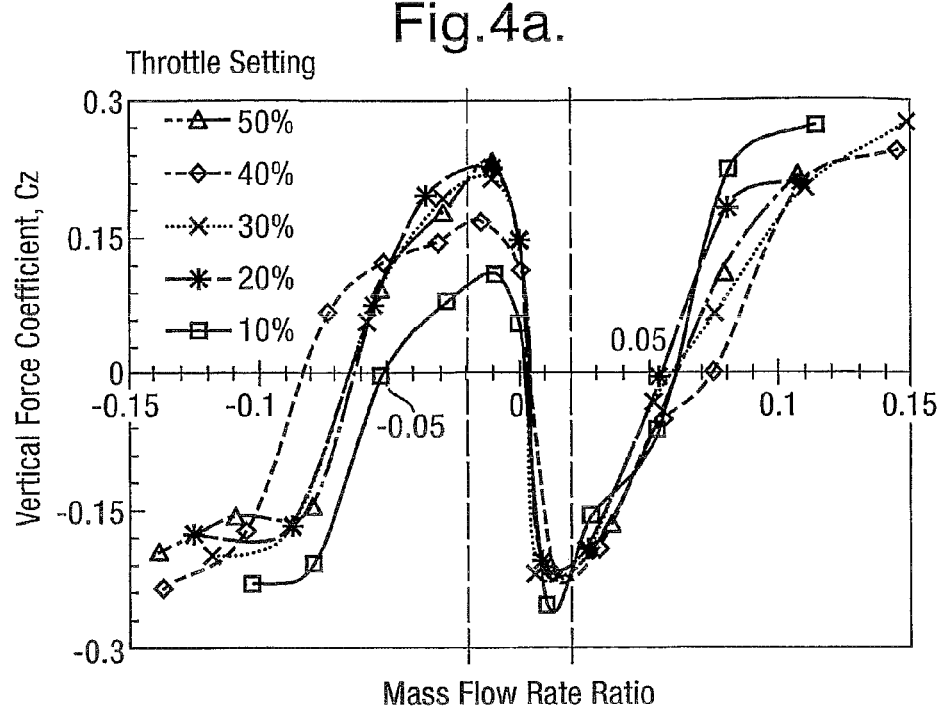
Figure 4B:
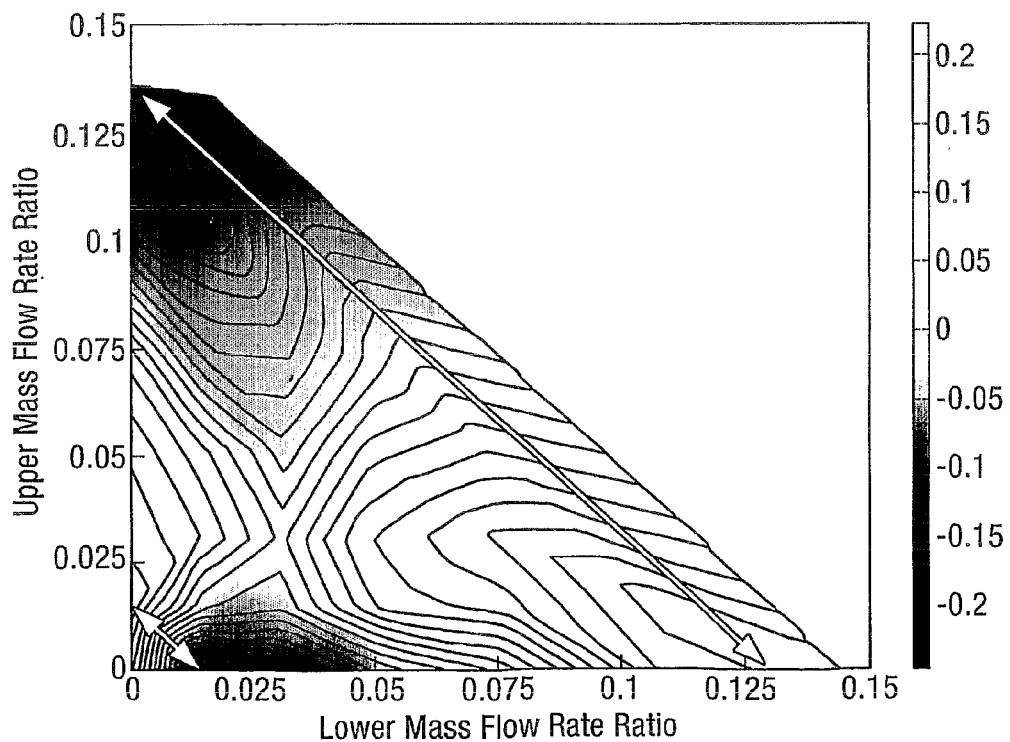
Figure 5:
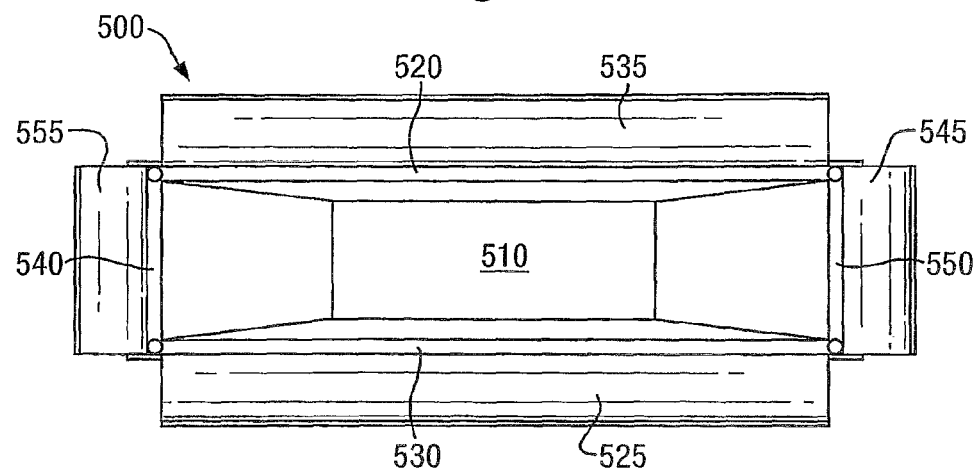
Figure 6:
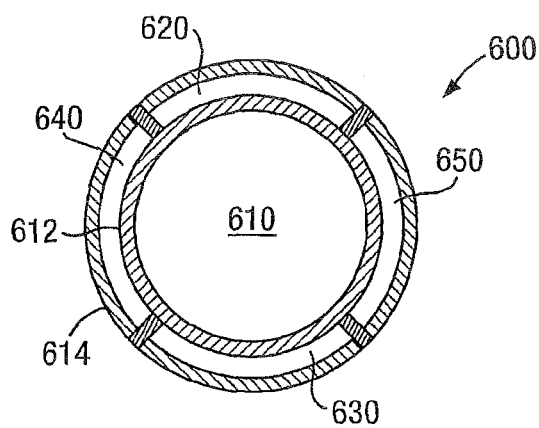

FIGS. 4a, and 4b illustrate the variation of normal force coefficient with mass flow through upper and lower secondary jets, as observed using apparatus in accordance with the first embodiment of the invention;

FIG. 5 is a rear view of a tailpipe in accordance with a second embodiment of the present invention; and FIG. 6 is a rear view of a tailpipe in accordance with a third embodiment of the invention.

Jet engines generate thrust through the expulsion of a jet of fluid. The reaction force to the expulsion of fluid generates forward thrust on the engine. The direction of the thrust is thus entirely dependent on the direction in which the fluid jet is emitted. Thrust vectoring, herein, is used to refer to the changing of the direction in which the jet of fluid is expelled, in order to change the direction of thrust exerted on the engine. The present invention relates to fluidic thrust vectoring, where a change in direction of the expelled jet is effected via the use of secondary flows of fluid that interact with the primary, thrust-generating fluid jet, in order to change the direction in which the primary jet is exhausted from the jet engine.

Figure 1:
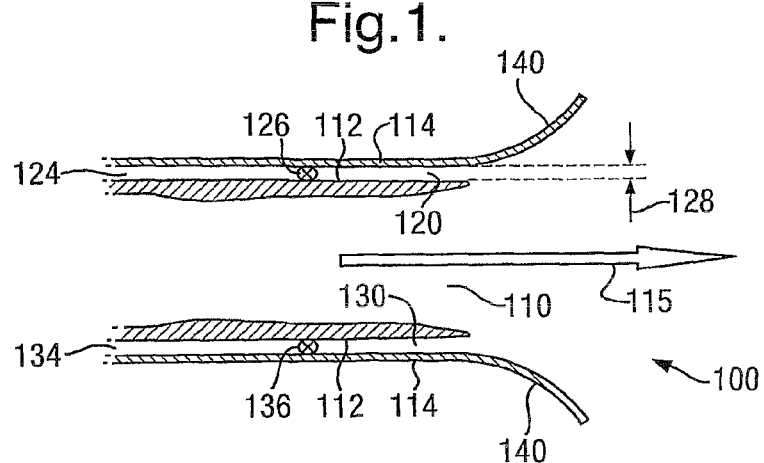
FIG. 1 is a schematic cross-sectional view of the tailpipe of a jet engine in accordance with a first embodiment of the present invention.
Figure 3:
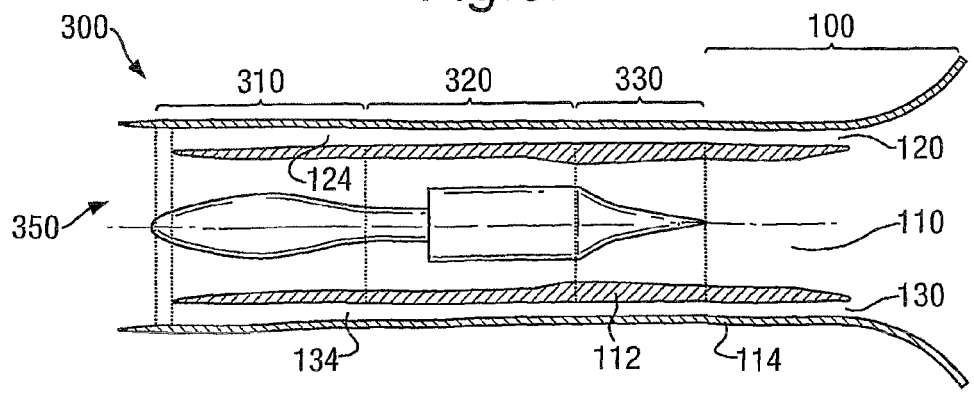
FIG. 3 illustrates a jet engine incorporating the tailpipe illustrated in FIG. 1.

Apparatus 100 in accordance with a first embodiment of the invention is illustrated in FIG. 1. FIG. 1 is a cross-sectional view along the axis of apparatus 100, which apparatus may form a part of the tailpipe of a jet engine, such as jet engine 300 that is illustrated in FIG. 3 and described in more detail below. Apparatus 100 comprises a housing having inner and outer parts 112 and 114 respectively. Inner part 112 of the housing defines a primary outlet 110 from which, in operation of the jet engine, a primary jet 115 is exhausted. The height of primary jet 115, in the present embodiment, is 20 mm. The expulsion of primary jet 115 generates the primary source of propulsion for the jet engine. Apparatus 100 also comprises secondary outlets 120, 130, from which secondary flows may be expelled in order to vector the primary jet 115. The height of the secondary outlets 120, 130, in the present embodiment, is 0.2 mm. At its exhaust end, the inner housing 112, that provides a wall between the primary and secondary outlets, is 0.5 mm thick.

Figure 2:
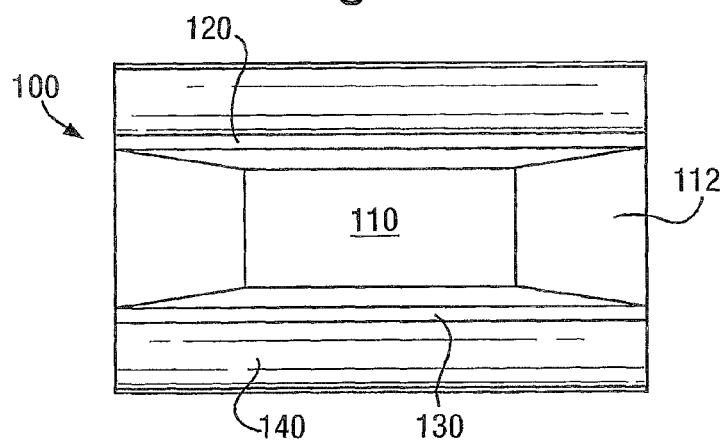
FIG. 2 is a rear view of the tailpipe illustrated in FIG. 2.

Secondary outlets 120, 130 are formed at the rearward (exhaust) end of ducts 124, 134 that communicate between the secondary outlets 120, 130 and a fluid source (not shown in FIG. 1), and that are formed between the inner 112 and outer 114 parts of the housing of apparatus 100. The ducts 124, 126 taper towards their exhaust ends to define the secondary outlets 120, 130. Secondary outlets 120, 130 are formed at opposing outer regions of the primary outlet 110. As can be seen more clearly from FIG. 2, which is a schematic view of apparatus 100 from its rear, and the primary outlet 112 is rectangular, and located centrally in apparatus 100, whilst secondary outlets 120, 130 are located respectively in upper and lower edge regions of the apparatus 100. It is noted that, in FIG. 2, the primary 110 and secondary outlets 120, 130 are shaded using a repeated diagonally downward line, whilst the inner housing 112 and Coanda surfaces 140 are continuously shaded.

Referring again to FIG. 1, the flow through the secondary outlets 120, 130 is separately controllable via control valves 126, 136 provided in ducts 124, 134 respectively. Control valves 126, 136 are operable to control the mass flow through the secondary outlets to be within the range 0% to 2% of the mass flow through the primary outlet. Control valves 126, 136 are selected to provide the required degree of control over the mass flow through the secondary outlet, and in the present embodiment are selected to be ball valves. As will be seen from FIG. 1, secondary outlets 120, 130 are arranged to emit secondary flows in a direction substantially parallel to that of the primary jet 115.

Coanda surfaces 140 extend from the outer housing 114 of apparatus 100, adjacent each of the secondary outlet 120, 130. Coanda surfaces 140 are arcuate surfaces that curve away from the axis of the apparatus 100. The Coanda surfaces 140 are shaped so as to entrain moving fluid to follow their surface, in accordance with the Coanda effect. It has been established theoretically that, for best effect, Coanda surface 140 should have the form of a section of a logarithmic spiral (being a spiral defined by the polar equation $r=ae^{b\theta}$, in which a and b are constants, and r and $\theta$ are the polar co-ordinates of the curve). However, experiments have demonstrated that a Coanda surface having such a complex curvature outperform surfaces having a more simple curvature by only a small margin. Therefore, in the present embodiment, for simplicity, the Coanda surfaces 140 are given a curvature having the form of a simple circular arc, which circular arc has a radius of curvature selected to be 100 mm.

At the exhaust end of the inner housing 112, where the primary outlet 110 is defined, steps are present between the inner housing 112 and the outer housing 114, which outer housing 114 extends beyond the exhaust end of the inner housing 112 to form Coanda surfaces 140. The step present on the upper portion of the apparatus 100 has a height defined between the dashed lines indicated at reference numeral 128. As will be seen, a similar step is present in the lower portion of apparatus 100, although not specifically indicated by a reference numeral. The step height, in the present embodiment, is 0.7 mm. Thus, moving along the inner wall of the inner housing 112, towards the exhaust end of apparatus 100, an outward step is observed at the position of the primary outlet. The step is arranged such that, in normal operation, primary jet 115 separates from the inner wall of the inner housing 112 at this step.

FIG. 3 illustrates schematically a jet engine 300 incorporating the apparatus 100 according to the first embodiment of the invention. In FIG. 3, parts already described with reference to FIGS. 1 and 2 above are given like reference numerals, and are not described further. Jet engine 300 is of the low-bypass type used frequently for military aircraft, and comprises housing 112, 114, compressor section 310, combustion section 320, and turbine section 330. Air is inducted into the engine at intake 350. Intake air is compressed by compressor section 310 and combusted in combustion section 320. Exhaust gases from the combustion section are used to drive turbines in the turbine section 330, which in turn drive the compressor fans in compressor section 320. Finally, the exhaust gases are expelled through the primary outlet 110 of apparatus 100 (that has already been described with reference to FIGS. 1 and 2). The expulsion of the exhaust gases from the jet engine 300 generates a forward thrust on the engine that, as illustrated in FIG. 3, acts towards the left of the drawing.

Bleed air from either the compressor section or the combustion section may conveniently be used to provide a source of fluid for the secondary jets emitted through the secondary outlets 120, 130 of the apparatus 100. As is shown in FIG. 3, in the present embodiment, air from the intake part of the compressor section is taken via ducts 124, 126 in order to provide a flow of air for the secondary jets 120, 130.

In order to vector the thrust produced by the jet engine 300, the mass flow through the secondary outlets 120, 130 is controlled to be within the range 0% to 2% of the mass flow through the primary outlet 110. Referring specifically to the arrangement of FIG. 1, in order to vector the primary jet upwards, and so to generate a downward thrust component on the apparatus 100, a secondary flow is emitted from the lower secondary outlet 120. Thus, valve 126 is opened to allow the desired mass flow through the lower secondary outlet 120, whilst valve 136 remains closed. Similarly, in order to vector the primary jet downwards, and so to generate an upward thrust component on the apparatus 100, a secondary flow is emitted from the upper secondary outlet 130. Thus, valve 136 is opened to allow the desired mass flow through the upper secondary outlet 130, whilst valve 126 remains closed.

The degree of deflection of the thrust can be controlled by controlling the mass flow through the respective secondary outlet within the range 0% to 2% of the mass flow through the primary outlet. In this range, a higher mass flow through one secondary outlet results in a larger the deflection towards the opposing secondary outlet. FIGS. 4a and 4b illustrate the variation of the normal force coefficient with the ratio of the mass flow between the primary and secondary jets. In FIG. 4a, the variation of the normal force coefficient is plotted against the mass flow rate ratio for a number of different throttle settings. As can be seen, whilst the magnitude of the deflection effect changes as the throttle setting is increased from 10% to 50%, qualitatively, the effect of the secondary jets can be seen to be similar. The maximum deflection of the primary jet is of order 20° to 30° from the un-deflected jet.

As is seen in FIG. 4a, a dramatic increase in the magnitude of the deflection is observed as the mass flow through the secondary outlet is increased from 0% to 2% of the mass flow through the primary outlet. At around the ratio of 2%, indicated by the dashed lines on the FIG. 4a, a peak in the magnitude of the normal force coefficient is observed. Above the peak, further increasing the mass flow in the secondary flow results in a decrease in the magnitude of the deflection, at a slower rate than the increase observed up to the peak. A crossover is then observed in the deflection direction at a mass flow through the secondary jet of around 5% that through the primary jet. Up to the crossover point, for mass flow ratios below around 5%, the deflection of the primary jet is away from the secondary jet, depicted in the graphs shown in FIG. 4a as a negative normal force coefficient. Above the crossover point at the mass flow ratio of around 5%, the direction of the deflection reverses, and the magnitude of the deflection increases with increasing mass flow through the secondary jets.

Prior-known fluidic thrust vectoring systems have exploited the higher secondary mass-flow regime, in which the direction of deflection is towards the activated secondary jet, rather than away from it. However, as is demonstrated in FIG. 4a, a similar degree of control to that achievable in the higher mass flow regime (i.e. for a secondary jet mass flow between 5% and 15% of the primary jet mass flow) can be obtained using the much smaller mass flow in the secondary jet of up to 2% of the mass flow through the primary jet.

FIG. 4b further illustrates the change in normal force coefficient with mass flow through the secondary outlets. In graph 400, mass flow through the upper secondary outlet is expressed on the vertical axis; mass flow through the lower secondary outlet is expressed on the horizontal axis; and the normal force coefficient is expressed in levels of gray-shading, with darker colours representing a negative deflection, and lighter colours representing a positive deflection. The white arrows on the Figure provide a direct graphical comparison between the amount of change in mass flow ratio required to effect equivalent changes the normal force coefficient in the high and low secondary flow regimes.

It is currently thought that, for low mass flow through the secondary outlet, the deflection observed results from a pressure effect in the vicinity of the steps defined between the inner and outer housing 112, 114, into which region the secondary flows are expelled from the secondary outlets. When a primary jet is exhausted through primary outlet 110, low pressure regions form in the vicinity of the steps. Here, it will be understood that, by 'low', it is meant that the pressure in the vicinity of the steps is lower than the pressure of the primary jet. Thus, activation of a secondary flow from one of the secondary outlets results in a region of increased pressure at that activated secondary outlet in comparison to its opposing secondary outlet. This difference in pressures on either side of the primary jet results in a slight deflection of the primary jet towards the secondary outlet opposing the activated secondary outlet. The slight deflection is sufficient for the primary jet to be entrained by the Coanda surface adjacent that opposing secondary outlet, resulting in the large observed deflection. A competing effect, that of entrainment of the secondary flow by the Coanda surface adjacent to it, and the corresponding entrainment of the primary jet by that activated secondary flow, is thought to be responsible for the observed deflection at higher mass flow ratios that has been exploited in prior known fluidic thrust vectoring systems. Where the mass flow through the secondary outlet is small, the latter effect is thought to be negligible effect in comparison to the increased pressure effect.

The lower mass flow rate required through the secondary outlets 120, 130 for effective thrust vectoring enables the design of the secondary outlets 120, 130 to be made more robust than has previously been possible. In particular, secondary outlets 120, 130 can be fabricated not as large single outlets, but rather as an array of outlets within an otherwise solid material. The total area of the outlet need not be large because the mass flow required in order to effect thrust vectoring is small. Thus, solid material can be used to fill the secondary outlet, and small holes fabricated in the solid material in order to enable a secondary flow to pass through the secondary outlet. The ability to fill the secondary outlets with more material enables the high tolerances required for the height of the secondary outlet, over its entire width, to be more easily achieved.

In the present embodiment, the height of the secondary outlet is 0.2 mm, and its width is 200 mm. In order to obtain sufficiently uniform flow through the secondary outlets, it is necessary to maintain a constant height, to within a tolerance of 5%, for the secondary outlet across its entire width. Thus the height of the secondary outlet in the present embodiment must be maintained within a tolerance of 0.01 mm. The fabrication of the holes in such outlets can be achieved by laser drilling holes of the appropriate diameter in a single metal piece. In the present embodiment, holes of diameter 50 μm are formed in a solid metal piece.

Apparatus 500 in accordance with a second embodiment of the invention is illustrated in FIG. 5. FIG. 5 is a schematic diagram of apparatus 500 viewed from its exhaust end. The second embodiment is similar in all respects to the first embodiment described above, except in that four secondary outlets are provided, rather than only two. Upper and lower secondary outlets 520 and 530 are provided as in the first embodiment. The provision of a secondary flow through upper secondary outlet 520 or lower secondary outlet 530 results in entrainment of the primary jet by lower or upper Coanda surface 525 or 535 respectively. Secondary outlets 540 and 550 are also provided to the left and right of primary outlet 510. The provision of a secondary flow through the left secondary outlet 540 or right secondary outlet results in entrainment of the primary jet by right or left Coanda surfaces 545 or 555 respectively. Other aspects of the second embodiment, which is otherwise the same as the first embodiment, and functions analogously thereto, are not described further. By providing four secondary outlets in four edge regions of apparatus 500, surrounding the central primary outlet, the primary jet can be vectored in four different directions, rather than only upwards or downwards. Thus the second embodiment provides a greater degree of manoeuvrability than the first embodiment.

Apparatus 600 in accordance with a third embodiment of the present invention is illustrated in FIG. 6. FIG. 6 is a schematic diagram of apparatus 600 viewed from its exhaust end in which, for clarity, only the housings defining the primary and secondary outlets are shown. The third embodiment is similar in all respects to the second embodiment described above, except in that the shape of outlet is circular. A central primary outlet is provided, with secondary outlets being provided at annular regions of the apparatus 600 as illustrated. As with the second embodiment, four secondary outlets are provided, enabling control of the thrust deflection in four separate directions. Thus, secondary outlets 620 and 630 are provided at upper and lower annular regions of apparatus 600, and secondary outlets 640 and 650 are provided at left and right annular regions of apparatus 600. The Coanda surfaces are not illustrated in FIG. 6, although it will be understood that the Coanda surfaces would be provided adjacent each of the secondary outlets in a manner analogous to that illustrated in FIG. 5.

Apparatus in accordance with a fourth embodiment of the invention, not illustrated in the accompanying drawings, is very similar to the first embodiment of the invention except in the manner in which the secondary outlets are formed. In accordance with the fourth embodiment of the invention, an inherently porous material is provided at the secondary outlets, instead of the secondary outlets being formed of a material that is made porous by the provision of a number of holes defined in an otherwise solid material. Such an inherently porous material can be either a metallic or ceramic foam selected to be able to withstand the high temperatures present at the exhaust of a jet engine. In all other respects, the fourth embodiment of the invention is identical to the first embodiment of the invention. As with the first embodiment of the invention, it is possible to use such foam-like material at the secondary outlet because of the small mass flow required through the secondary outlets.

Apparatus in accordance with a fifth embodiment of the invention, not illustrated in the accompanying drawings, is also similar to the first embodiment of the invention. The fifth embodiment differs from the first embodiment only in that the source of fluid for the secondary flows is not provided from a fluid source within the jet engine, such as from the compressor section, but is instead drawn from the ambient atmosphere. As described above with reference to the first embodiment of the invention, low pressure regions are formed in the vicinity of the steps between the inner and outer parts of the housing at the primary outlet, such that opening valves in ducts leading to atmosphere results in suction of atmospheric air through those ducts to provide the required secondary flow. Since the required secondary flow is small, such a suction effect can result in a pressure difference across the primary jet that is sufficient to cause significant vectoring of the thrust developed by the jet engine in accordance with the principles described above.

Having described the invention with reference to various specific embodiments, it is noted that these embodiments are purely exemplary, and that variations and modifications to these embodiments are possible without departing from the spirit and scope of the invention, which is defined in the appended claims. Such variations and modifications will be readily apparent to the skilled reader.

For example, whilst the above embodiments relate to the application of thrust vectoring to low-bypass jet engines used in military aircraft, those skilled in the art will appreciate that the invention could also be used for high-bypass jet engines, or indeed for the vectoring of any fluid jet. Furthermore, whilst it has been described above to use bleed air from the engine in order to provide the fluid source for the secondary jets, or simply to use air from the ambient atmosphere, it will be noted that many other fluid sources can be used in the above-described embodiments of the invention. It will also be appreciated that many types of flow control means could be used in embodiments of the present invention, including ball valves, as described above, other valves such as, for example, butterfly valves, and any other device capable of controlling the flow of fluid through a duct in a jet engine.

It is also to be noted that, whilst the invention has been described above with reference to a relatively small-scale jet engine, the apparatus can be readily enlarged in order to fit larger jet engines. In enlarging the thrust vectoring apparatus of the present invention, it is to be noted that the fluid dynamic effects exploited by the present invention are dependent primarily on the ratios between key dimensions of the thrust vectoring apparatus, rather than their absolute values. Thus, for example, to construct a thrust vectoring apparatus having a rectangular primary outlet larger than that described above in relation to the first embodiment, the ratios between the radius of curvature of the Coanda surface, the secondary outlet height, and the primary outlet height should be maintained at the values for the first embodiment. Thus, the ratio of secondary outlet height to Coanda surface radius may be 0.02; although it is expected that other values in the range between 0.002 and 0.2 may also work in alternative embodiments of the invention. The ratio of primary outlet height to Coanda surface radius may be 0.2; although it is expected that other values in the range between 0.02 and 2 may also work in alternative embodiments of the invention. The ratio of wall thickness between the primary and secondary outlets to the secondary outlet height, in the above described first embodiment, is 2.5. Wall thicknesses in the range between 2.5 and 5 times the secondary outlet height have been tested satisfactorily using apparatus of the same scale as the first embodiment. However, at the small scale of the first embodiment, manufacturing considerations prevent the wall thickness being made smaller, and it is anticipated that, for larger engines, the ratio of wall thickness to secondary outlet height could be decreased. Simple modifications of the above described thrust vectoring apparatus are also possible in order to provide a fluidic thrust vectoring capability to many different types of aircraft, either military or civil, and to many different types of jet engine.

Finally, it is to be clearly understood that any feature described above in relation to any one embodiment may be used alone, or in combination with other features described, and may also be used in combination with one or more features of any other of the embodiments, or any combination of any other of the embodiments.

The invention claimed is:

1. Thrust vectoring apparatus for a jet engine, the jet engine being operable to exhaust a primary jet to generate thrust; and the apparatus comprising:
   (i) a housing defining a primary outlet for emitting the primary jet;
   (ii) first and second Coanda surfaces extending from opposing regions of an exhaust end of said housing, each Coanda surface being outwardly spaced from the primary outlet such that a first and a second step are each defined between the respective first and second Coanda surfaces and the primary outlet; whereby, when a primary jet is exhausted through the primary outlet, low pressure regions are formed in the vicinity of said steps;
   (iii) ducts leading from a fluid source to first and second secondary outlets, the first secondary outlet being located adjacent the first Coanda surface and the second secondary outlet being located adjacent the second Coanda surface, the first and second secondary outlets each being arranged to emit a respective first and second secondary flow into the low pressure region in the vicinity of the respective first and second steps defined between the respective first and second Coanda surfaces and the primary outlet; and
   (iv) flow control means operable to control the mass flow through the first and second secondary outlets respectively to be within the range 0% to 5% of the mass flow in the primary jet such that when the first secondary flow is emitted from the first secondary outlet the primary jet is entrained by the second Coanda surface and when the second secondary flow is emitted from the second secondary outlet the primary jet is entrained by the first Coanda surface.

2. Thrust vectoring apparatus as claimed in claim 1, wherein the flow control means are operable to control the mass flow in the secondary flow within the range 0% to 2% of the mass flow in the primary jet.

3. Thrust vectoring apparatus as claimed in claim 1, wherein the ducts are configured to receive fluid from the ambient atmosphere surrounding the jet engine.

4. Thrust vectoring apparatus as claimed in claim 1, wherein the ducts are configured to receive bleed gases from the jet engine.

5. Thrust vectoring apparatus as claimed in claim 4, wherein the ducts extend between one of the group of a compressor section, a combustion section, and a bypass section of the jet engine and each secondary outlet.

6. Thrust vectoring apparatus as claimed in claim 1, wherein the secondary outlets contain porous material through which the secondary jet can be emitted.

7. Thrust vectoring apparatus as claimed in claim 1, wherein the flow control means comprise a valve in operable association with each secondary outlet.

8. Thrust vectoring apparatus as claimed in claim 1, wherein the primary outlet is generally rectangular.

9. Thrust vectoring apparatus as claimed in claim 1, wherein the primary outlet is generally circular.

10. Thrust vectoring apparatus as claimed in claim 1, wherein the secondary outlets are arranged to emit the secondary flow generally tangentially to the primary jet.

11. A jet engine comprising the thrust vectoring apparatus as claimed in claim 1.

12. A method of upgrading a jet engine, comprising retrofitting the apparatus claimed in claim 1 to the jet engine.

13. A method of vectoring thrust generated by a jet engine, the jet engine comprising a housing defining a primary outlet for exhausting a primary jet to generate thrust, and first and second Coanda surfaces extending from opposing regions of said housing and outwardly spaced from the primary outlet such that a first and a second step are defined between the respective first and second Coanda surfaces and the primary outlet; the method comprising the steps of:
   (i) exhausting the primary jet from the primary outlet, such that low pressure regions are formed in the vicinity of said steps;
   (ii) emitting a respective first and second secondary flow into the low pressure region in the vicinity of the respective first and second steps between the respective first and second Coanda surfaces and the primary outlet, the first and second secondary flows each having a mass flow within the range 0% to 5% of the mass flow in the primary jet, to vector the thrust generated by the jet engine towards the second Coanda surface when the first secondary flow is emitted from the first secondary outlet and to vector the thrust generated by the jet engine towards the first Coanda surface when the second secondary flow is emitted from the second secondary outlet; and
   (iii) controlling the mass flow through the secondary outlet in order to control the degree to which the thrust is vectored.

* * * * *